Dec. 22, 1959  G. CELLUCCI  2,918,309
SAFETY DEVICE FOR TRAILER-TRACTORS
Filed March 12, 1958  4 Sheets-Sheet 1

Inventor
Guido Cellucci
by Arthur D Thomson
Attorney

Dec. 22, 1959 G. CELLUCCI 2,918,309
SAFETY DEVICE FOR TRAILER-TRACTORS
Filed March 12, 1958 4 Sheets-Sheet 2
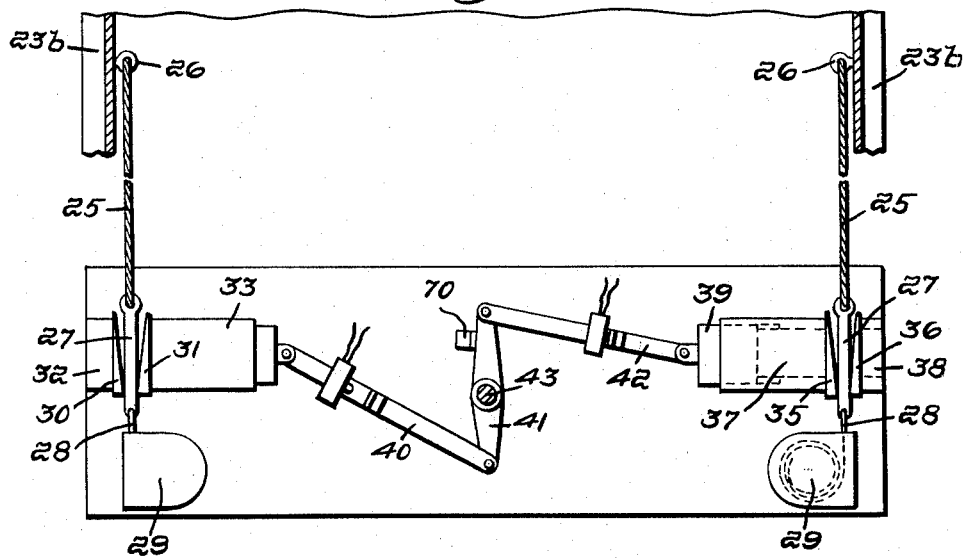
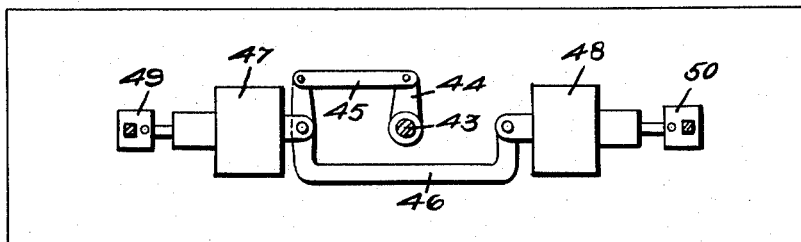
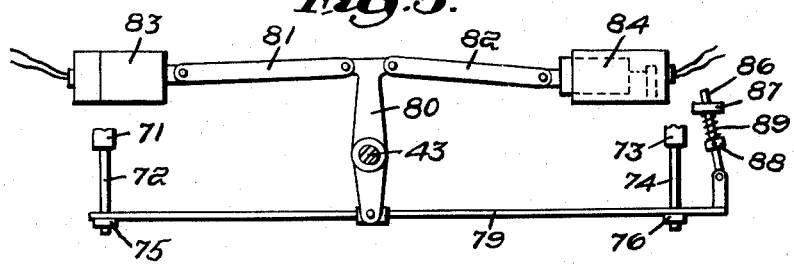
Inventor:
Guido Cellucci
by Arthur D Thomson
Attorney Dec. 22, 1959   G. CELLUCCI   2,918,309
SAFETY DEVICE FOR TRAILER-TRACTORS
Filed March 12, 1958                           4 Sheets-Sheet 3
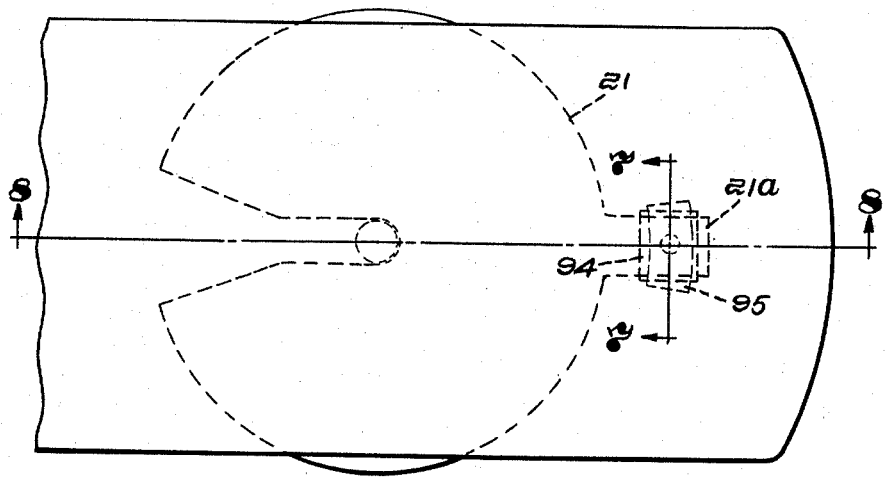
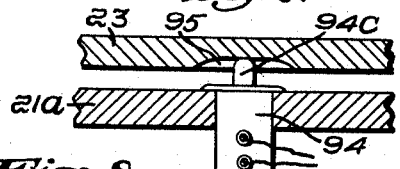
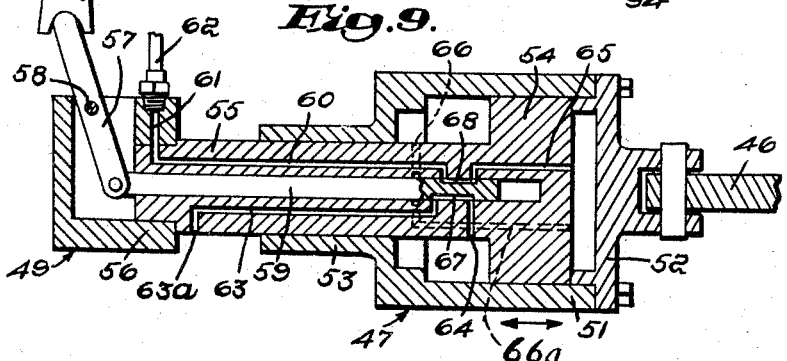
Inventor:
Guido Cellucci
by Arthur D Thomson
Attorney Dec. 22, 1959   G. CELLUCCI   2,918,309
SAFETY DEVICE FOR TRAILER-TRACTORS
Filed March 12, 1958   4 Sheets-Sheet 4

Inventor:
Guido Cellucci
by Arthur D Thomson
Attorney

United States Patent Office 2,918,309
Patented Dec. 22, 1959

2,918,309

SAFETY DEVICE FOR TRAILER-TRACTORS

Guido Cellucci, Quincy, Mass.

Application March 12, 1958, Serial No. 720,931

9 Claims. (Cl. 280—432)

This invention relates to trailer-tractors and more particularly to devices for preventing the trailer from "jack-knifing," or accidentally swinging at right angles to the tractor.

A trailer-tractor unit of the type for which this invention is intended is essentially a six wheeled vehicle consisting of a four wheel tractor or truck to which a trailer is removably attached. The trailer has wheels only at the rear and its forward end is supported on the tractor by means of a "fifth wheel" which engages a pin on the trailer body. The trailer pivots on the fifth wheel in order to permit the vehicle to turn. These vehicles are ordinarily large and heavy, a typical example weighing ten tons when loaded. A number of serious accidents have occurred because the driver has no positive lateral control over the trailer, which is usually the heaviest part of the combination. If the driver puts on the brakes suddenly, the trailer is likely to "jack knife" or swing sharply around its pivot and throw the truck out of control. In many cases the momentum of heavily loaded trailers has caused the vehicle to turn over or go off the road. Even if the trailer itself is equipped with brakes, the braking force on its rear wheels may be insufficient to hold it in line, especially on slippery surfaces, or when the vehicle is going down a steep hill and most of the weight is thrown on to the truck.

The trailer must be free to swing sidewise, as otherwise the vehicle could not be manoeuvered around corners. Various devices which have been designed to prevent jack knifing permit the driver to lock the trailer rigidly to the tractor if an accident appears imminent. These devices, however, cannot be kept locked for ordinary driving because the vehicle cannot be turned while they are in use. Their effectiveness, therefore, depends entirely on the alertness and quickness of the driver in anticipating an accident. Furthermore, once the trailer is locked, the manoeuverability of the vehicle is seriously limited, and the driver may get involved in a worse accident because he cannot turn to avoid other vehicles or follow a curve in the road.

The principal object of this invention is to provide a safety device which operates continuously to prevent the trailer from jack knifing, without interfering with the normal steering of the vehicle. Another object is to provide a device which requires no attention from the driver, which cannot be accidentally disengaged, and which yet will disengage automatically when it becomes necessary to permit the trailer to swing sharply, as in making a sharp turn or backing into a narrow space.

The device consists essentially of a pair of retractable cables which are attached to the trailer at laterally spaced points, and a control unit mounted on the body. The cables carry rings which are engaged by a pair of locking pistons, when the vehicle is being steered straight or in a gradual curve. When the driver turns the steering wheel past a certain degree, as in deliberately making a sharp turn, an electrically controlled pneumatic linkage causes the pistons to be retracted, releasing the cables so that the outer of the pair can play out and permit the trailer to swing freely. When the vehicle has again straightened out, the control system automatically returns the pistons to locking position.

In the drawings illustrating the invention:

Fig. 3 is a cross-section taken along line 3—3 of Fig. 2 showing the locking pistons in unlocked position;

Fig. 4 is a partial cross-section taken along line 4—4 of Fig. 2;

Fig. 5 is a partial cross-section taken along line 5—5 of Fig. 2;

Fig. 6 is an enlarged schematic plan view taken in the region of the fifth wheel of the trailer-tractor showing the location of the fifth wheel switch;

Fig. 7 is an enlarged fragmentary cross-section taken along line 7—7 of Fig. 6;

Fig. 8 is an enlarged fragmentary cross-section taken along line 8—8 of Fig. 6;

Fig. 9 is an enlarged fragmentary cross-section through one of the control valves and air cylinders.

Figure 1:
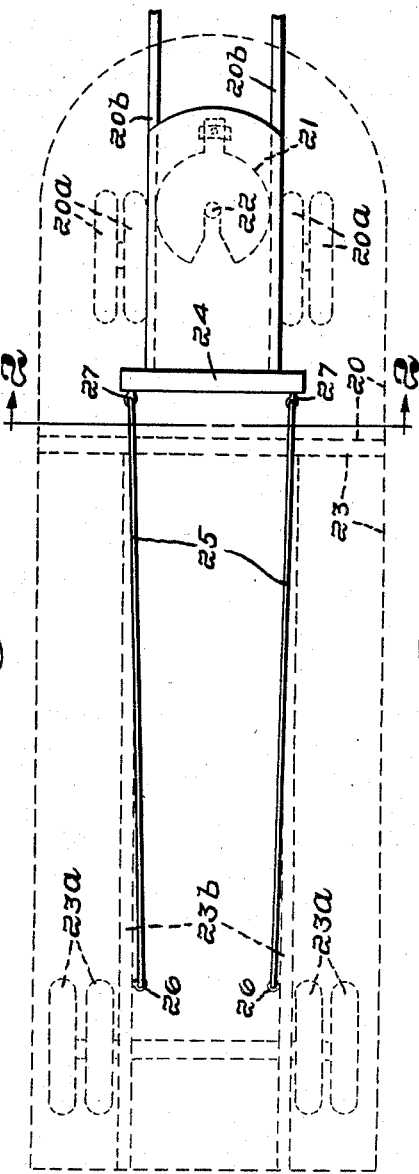
Fig. 1 is a schematic plan view of a trailer-tractor equipped with a safety device constructed according to the invention.

The rear portion of the tractor is generally indicated by the dotted outline 20 in Fig. 1. The tractor is of the usual type having rear wheels 20a, a chassis 20b, and a fifth wheel, indicated by the dotted line 21, which is slotted to receive a pin 22 mounted on the under side of the forward part of the trailer. The trailer, generally indicated by the dotted outline 23, has a set of rear wheels 23a and frame bars 23b under the body. The forward part of the trailer body is supported on the fifth wheel 21 in such a manner that the trailer may swing on pin 22 from side to side with respect to the tractor.

The control unit for the safety device is disposed in a housing 24, mounted on the rear of the tractor 20. The control cables 25 extend from the rear of the housing 24 and are fastened in any convenient manner to the trailer body, for example, by hooks passing through rings 26 attached to frame bars 23b.

Figure 2:
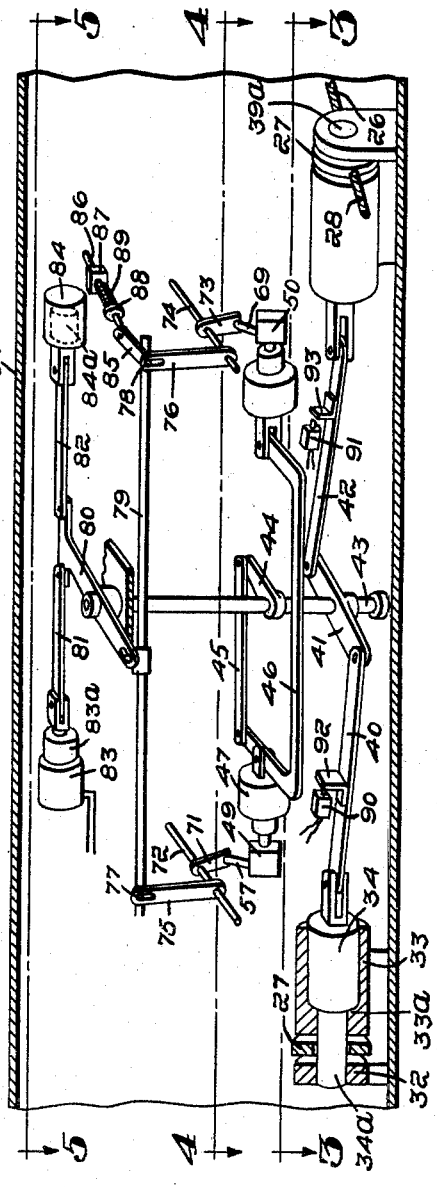
Fig. 2 is an isometric view of the control unit of the device, in locked position, parts of the housing being shown broken away.

As shown in Figures 2 and 3, each of the cables 25 is attached to a ring 27. Each of a pair of second cables 28 is attached to one of the rings 27 and is received in a spring-tensioned reel 29. The left-hand ring is received between a pair of sloping guides 30 and 31, one of which is mounted on a block 32 and the other of which is mounted on a piston housing 33. The piston housing slidably receives a locking piston 34 having a reduced extension 34a which passes through the left-hand ring 27 and is received in block 32. Housing 33 has an internal shoulder 33a against which the piston 34 seats. The right-hand ring 27 is received in a similar assembly consisting of guides 35, 36, piston housing 37, block 38 and a locking piston 39 having a reduced extension 39a which passes through this ring into block 38. When pistons 34 and 39 are in the position shown in Fig. 2, rings 27 are locked in place between their respective guides. Cables 25 are thus locked to the control unit on the tractor. These cables are of such a length as to provide some slack so that trailer can swing enough to permit normal steering in and out of traffic or along a gradually curved road, but the trailer cannot swing far enough to jack knife.

Piston 34 is connected by a link 40 to one end of an arm 41, and piston 39 is connected by a link 42 to the other end of arm 41. The arm is fixed to a shaft 43 which is journalled in appropriate bearings mounted in housing 24. A second arm 44 is fixed to shaft 43 above arm 41 and has its outer end connected by a link 45 to a yoke 46. This yoke is rigidly connected to a pair of pneumatic cylinders 47 and 48 controlled, respectively, by valve operators 49 and 50.

One of the valve and cylinder assemblies, for example the left-hand cylinder of Fig. 2, is shown in detail in Fig. 9. The cylinder has a casing 51 with an end plate 52 to which yoke 46 is rigidly bolted. The casing has a tubular sleeve 53. A piston 54 is slidably mounted in the casing and carries a tubular piston rod 55 which projects through sleeve 53 and is rigidly attached to the body 56 of valve operator 49. This body is slotted to receive an arm 57 which is pivoted on the body at 58. The lower end of arm 57 is connected to a rod 59 which is slidably mounted inside piston rod 55.

A passage 60 in piston rod 55 communicates with a passage 61 in casing 56. Passage 61 leads to an external hose connection 62 which is connected to a vacuum system, not shown, for example the vacuum end of a pneumatic system for operating air brakes, which is standard equipment on many tractors. Piston rod 55 also has a passage 63 leading to an outside port 63a, and a passage 64 leading to the interior of the cylinder casing 51 on the left side of the piston. A passage 65 in the piston leads to the interior of the cylinder casing on the right side of the piston. The piston also has passages 66a and 66 leading, respectively, from the interior of the piston rod to the right side and left side of the interior of the cylinder casing.

Rod 59 has a groove 67 on its under side and a groove 68 on its upper side. In the position shown, groove 67 is in communication with passages 63 and 64, and a groove 68 is in communication with passages 60 and 65. The left-hand side of the piston is thus subject to atmospheric pressure and the right side is under vacuum. If arm 57 is turned clockwise, groove 67 will establish communication between passages 63 and 65, and groove 68 will establish communication between passages 60 and 66. The right side of the piston 54 will then be subject to atmosphere and the left side under vacuum. Casing 56, along with piston rod 55, is fixed in any suitable way to housing 24 so that the cylinder casing 51, rather than the piston, will move. It is apparent that casing 51 will move to the right when arm 57 is turned clockwise, and back to the left when arm 57 is returned to the position shown in Fig. 9.

Valve operator 50 has an arm 69 corresponding to arm 57, and this operator and cylinder 48 are similar to operator 49 and cylinder 47, except that the passages in the piston are suitably reversed in position so that cylinder 48 also moves to the right when its operator arm is turned clockwise and to left when its operator arm is turned counterclockwise.

Movement of the two air cylinders carries yoke 46 to the right and to the left, imparting a similar motion to link 45. Shaft 43 is thus turned back and forth by arm 44 and turns arm 41. When yoke 46 is moved to the right, locking pistons 34 and 39 will be moved into a position to engage rings 27, as shown in Fig. 2, locking the cables 25 to the tractor. When yoke 46 is moved to the left, pistons 34 and 39 are disengaged from rings 27, as shown in Fig. 3. Spring wound cables 28 are then free to run out and allow the trailer to swing freely on the fifth wheel. In the unlocked position, arm 41 is engaged by a stop 70 fixed on the housing.

An arm 71 is fixed to a shaft 72 journalled in housing 24 in any suitable manner, and has a forked lower end which engages the upper end of arm 57. A similar arm 73 fixed to a similarly mounted shaft 74 engages arm 69. Another pair of arms 75 and 76 are fixed to shafts 72 and 74, respectively. Arms 75 and 76 are slotted at their upper ends and engage pins 77 and 78 mounted on the ends of a rod 79. A T-bar 80 is journalled for convenience on the upper end of shaft 43, but may be rotatably mounted in any convenient manner. This bar is linked to the center of rod 79 and is connected by a pair of links 81 and 82 to the armatures 83a and 84a of solenoids 83 and 84, respectively. When solenoid 84 is energized to pull in its armature, arm 80 will be rotated in such a direction as to move rod 79 to the left, and when solenoid 83 is energized, arm 80 will be turned to move rod 79 to the right. To ensure that rod 79 will stay in one position or the other when both solenoids are deenergized, an arm 85 is fixed to one end of rod 79 and linked to a rod 86 which is slidably mounted in a fixed block 87. Rod 86 carries a collar 88, and a compression spring 89 is mounted on the rod and bears on collar 88 and block 87. As rod 79 is moved right or left, rod 86 and its spring are moved through a dead center position, and spring 89 will exert a force on rod 79 to hold the latter in its extreme right or left position until one of the solenoids is again energized.

When rod 79 is moved to the right, by energizing solenoid 83, arms 75 and 76 will be turned clockwise, thus turning arms 71 and 73, and causing operator arms 57 and 69 to be turned counterclockwise. Cylinders 47 and 48 will thus be moved to the left. When rod 79 is moved to the left, by energizing solenoid 84, operator arms 57 and 69 will be turned clockwise and cylinders 47 and 48 will be moved to the right. It is thus apparent that, by energizing solenoid 83, the pistons 34 and 39 will be moved to unlock position, and by energizing solenoid 84, pistons 34 and 39 will be moved to locked position by means of the linkage here described.

Figure 10:
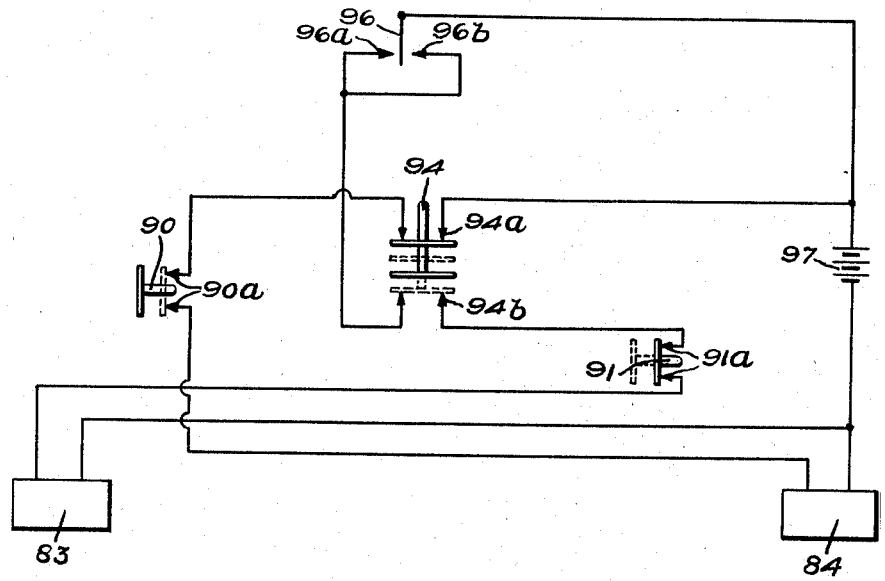
Fig. 10 is a wiring diagram of the electrical control system of the device.

An electrical circuit for controlling the solenoids shown in Fig. 10, includes several spring biased push button switches of generally conventional types. Two push button switches 90 and 91, each having a single pair of normally closed contacts, are mounted in the housing 24. Switch 90 is disposed to be engaged by a bracket 92, mounted on link 40, when the pistons 34 and 39 are in locked position, and switch 91 is disposed to be engaged by a bracket 93, mounted on link 42, when the pistons 34 and 39 are in the unlocked position. A double push button switch 94, having a pair of normally closed contacts 94a and a pair of normally open contacts 94b, is mounted on a bracket 21a near the fifth wheel 21, as shown in Figs. 6, 7 and 8. The body 23 of the trailer has, on its under side, a groove 95 in which the button 94c of switch 94 rides when the trailer is in line with the tractor. When the trailer swings sidewise in either direction with respect to the tractor, button 94c rides out of groove 95 and is depressed by the trailer body, opening contacts 94a and closing contacts 94b. Another switch 96 is mounted on the steering wheel and is arranged to close a contact when the steering wheel is turned in either direction beyond a certain degree, in the manner of a directional signal switch. A conventional signal switch, with its right and left contacts 96a and 96b wired together may be used for this purpose, or a push button switch with a pair of normally open contacts may be employed in connection with a groove of suitable length on the steering wheel in much the same arrangement as switch 94.

Solenoid 83 is connected in series with switch 91, contacts 94b of switch 94, and switch 96 to the battery 97 of the tractor. Solenoid 84 is connected in series with switch 90 and contacts 94a of switch 94 to the battery. The operation of the system is as follows:

When the trailer is aligned with the truck, and pistons 34 and 39 are in the locking position, switch 90 is open and switch 91 is closed. The push button of switch 94 is riding in groove 95, so that contacts 94a are closed and contacts 94b open. As switch 90 is open, solenoid 84 is deenergized, and solenoid 83 is also deenergized because both contacts 94b and switch 96 on the steering wheel are open. When the driver turns the steering wheel sharply in either direction to make a sharp turn, one of the contacts 96a or 96b will be closed. There is enough slack in the cables 26 so that the trailer can swing far enough in either direction to cause switch 94 to ride out of groove 95. As soon as this occurs in making a turn, solenoid 83 will be energized and, as a result, pistons 34 and 39 will be moved to unlocked position, as previously described. Switch 91 will then be opened by its engagement with bracket 93, deenergizing solenoid 84. Switch 90 is simultaneously closed, but solenoid 84 remains deenergized because contacts 94a are now open.

At the completion of the turn, the driver returns the steering wheel to normal position, opening switch 96. When the trailer has straightened out, button 94c returns to groove 95, allowing contacts 94a to close and contacts 94b to open. The closing of contacts 94a energizes solenoid 84 causing pistons 34 and 39 to return to locked position, engaging rings 27 which have been drawn back into their guides by the springs in reels 29 acting on cables 28. Switch 90 is then opened by its engagement with bracket 92, deenergizing solenoid 84.

In the operation of the device, the solenoid which causes the pistons 34 and 39 to lock or unlock is energized only momentarily, and is deenergized as soon as the locking or unlocking stroke is completed. The linkage is then held in the locked or unlocked position by the action of the spring 89, as previously described. The electrical circuits are therefore deenergized most of the time and do not cause any continuous drain on the battery. The control unit and its connections are permanently mounted on the tractor and it is only necessary to unhook the cables from the trailer when another trailer is to be attached to the tractor.

It is understood that variations may be made in the device. For example, chains or other means of attachment may be used instead of cables. The cables might also be brought forward and attached to the front part of the trailer as they would be effective to hold the trailer straight as long as they have sufficient horizontal run and lateral spacing from the center of the fifth wheel. The pneumatically driven linkage which moves pistons 34 and 39 might also be driven by a single cylinder or by an hydraulic cylinder or cylinders.

What is claimed is:

1. In combination with a trailer tractor consisting of a trailer, and a tractor having a fifth wheel on which the trailer is supported for lateral swinging movement, a safety device comprising: a pair of tie members connected to said trailer at laterally spaced points; said members each including a ring means connecting said rings to said tractor and adapted to permit longitudinal movement of said members to allow the trailer to swing; a pair of locking members mounted on said tractor in laterally spaced positions, one to either side of said fifth wheel; means on said tractor for drawing said rings into position to be engaged one by each of said locking members, and means for moving said locking members into engagement with the rings to lock said rings to the tractor, thereby preventing longitudinal movement of said members.

2. In combination with a trailer tractor consisting of a trailer, and a tractor having a fifth wheel on which the trailer is supported for lateral swinging movement, a safety device comprising: a pair of tie members connected to said trailer at laterally spaced points; said members each including a ring means connecting said rings to said tractor and adapted to permit longitudinal movement of said members to allow the trailer to swing; a pair of guides mounted on said tractor in laterally spaced positions, one to either side of said fifth wheel, said guides being adapted to receive said rings; a pair of locking members slidably mounted on said guides and adapted to pass through the rings and lock them to the guides, thereby preventing longitudinal movement of said members; and a linkage connected to said locking members and adapted to move them in unison into and out of engagement with said rings.

3. A device as described in claim 2, said locking members comprising a pair of pistons reciprocable toward and away from each other, and said linkage comprising a pair of links, one connected to each of said pistons, an arm rotatably mounted intermediate said pistons and having opposite ends to each of which one of said links is connected, and means for turning said arm.

4. In combination with a trailer tractor consisting of a trailer, and a tractor having a fifth wheel on which the trailer is supported for lateral swinging movement, a safety device comprising a pair of tie members connected to said trailer at laterally spaced points; said members each including a ring means connecting said rings to said tractor and adapted to permit longitudinal movement of said members to allow the trailer to swing; a pair of guides mounted on said tractor in laterally spaced positions, one to either side of said fifth wheel, said guides being adapted to receive said rings; a pair of locking members slidably mounted on said guides and reciprocable between a locked position, in which they pass through said rings and lock them to the guides, and an unlocked position in which they are disengaged from said rings; a pair of links, one connected to each of said locking members; a first arm having opposite ends, to each of which one of said links is connected; a shaft fixed to said arm intermediate said ends and rotatably mounted on the tractor; a second arm fixed to said shaft; and a fluid operated cylinder connected to said second arm and adapted to turn said second arm back and forth, thereby reciprocating said locking members between said locked and unlocked positions.

5. A device as described in claim 4, said cylinder having a control valve with a control handle movable back and forth between two positions, the valve being adapted to cause said cylinder to turn said second arm in one direction when the handle is in one of its positions and in the opposite direction when the handle is in its other position, the device including a pair of solenoids, means for alternatively energizing said solenoids, and a linkage operated by said solenoids and connected to said handle, said linkage being adapted to move said handle to one of its positions when one solenoid is energized and to the other of its positions when the other solenoid is energized.

6. A device as described in claim 5, said solenoid operated linkage including a spring arranged to hold the handle in one or the other of its positions when both said solenoids are deenergized.

7. In combination with a trailer tractor consisting of a trailer, and a tractor having a fifth wheel on which the trailer is supported for lateral swinging movement, and a steering wheel, a safety device comprising: a pair of tie members connected to said trailer at laterally spaced points means connecting said members to said tractor and adapted to permit longitudinal movement of said members to allow the trailer to swing; locking means adapted to lock each of said tie members to said tractor at predetermined laterally spaced positions, one on either side of said fifth wheel, said locking means being releasable to permit longitudinal movement of said tie members and permit the trailer to swing; means for returning said tie members to said positions when the trailer is aligned with the truck; electrically controlled operator means for locking and releasing said locking means, said operator means including a first and a second solenoid and being adapted to lock said locking means when the first solenoid is energized, and to release said locking means when the second solenoid is energized; a first switch operated by said steering wheel and arranged to be closed when the steering wheel is turned in either direction beyond a predetermined degree; a second switch mounted on said tractor, said second switch having a first pair of normally closed contacts and a second pair of normally open contacts; means on said trailer engageable with said second switch to open said first pair of contacts and close said second pair of contacts when the trailer swings a predetermined degree out of line with said tractor; an electric supply source; a first circuit including in series said source, said steering wheel switch, said second pair of contacts and said second solenoid; and a second circuit including in series said source, said first pair of contacts, and said first solenoid.

8. A device as described in claim 7, said tie members having sufficient slack when locked to said trailer to permit swinging of the trailer sufficiently to cause said second switch to be engaged to open said first pair of contacts and close said second pair of contacts.

9. A device as described in claim 7, having a third normally closed switch connected in said first circuit, and a fourth normally closed switch connected in said second circuit, said operator means including means for opening said third switch when said locking means is released, and means for opening said fourth switch when said locking means is locked.

References Cited in the file of this patent

UNITED STATES PATENTS

| | | |
|---|---|---|
| 2,213,221 | Johnson | Sept. 3, 1940 |
| 2,691,533 | Koontz | Oct. 12, 1954 |